(12) United States Patent
Westphal

(10) Patent No.: US 9,418,379 B2
(45) Date of Patent: Aug. 16, 2016

(54) SYSTEM AND METHOD FOR PROVIDING ACCESS TO PRODUCT INFORMATION AND RELATED FUNCTIONALITIES

(71) Applicant: W.W. GRAINGER, INC., Lake Forest, IL (US)

(72) Inventor: Geoffry A. Westphal, Evanston, IL (US)

(73) Assignee: W.W. GRAINGER, INC., Lake Forest, IL (US)

( * ) Notice: Subject to any disclaimer, the term of this patent is extended or adjusted under 35 U.S.C. 154(b) by 108 days.

(21) Appl. No.: 13/778,356

(22) Filed: Feb. 27, 2013

(65) Prior Publication Data

US 2014/0180876 A1 Jun. 26, 2014

Related U.S. Application Data

(60) Provisional application No. 61/745,088, filed on Dec. 21, 2012.

(51) Int. Cl.
*G06Q 30/06* (2012.01)

(52) U.S. Cl.
CPC ........ *G06Q 30/0625* (2013.01); *G06Q 30/0641* (2013.01)

(58) Field of Classification Search
CPC ............ G06Q 30/0601–30/0645; G06Q 30/08
USPC .............................................. 705/26.1–27.2
See application file for complete search history.

(56) References Cited

U.S. PATENT DOCUMENTS

| 2007/0061222 | A1* | 3/2007 | Allocca et al. ................... 705/26 |
| 2007/0293950 | A1* | 12/2007 | Haugen et al. ..................... 700/1 |
| 2008/0255967 | A1* | 10/2008 | Shi ..................... G06Q 30/0603 705/26.3 |
| 2009/0006338 | A1* | 1/2009 | Ives et al. .......................... 707/3 |
| 2010/0169336 | A1* | 7/2010 | Eckhoff-Hornback et al. ............................. 707/758 |
| 2010/0191582 | A1* | 7/2010 | Dicker et al. .................... 705/10 |
| 2010/0250336 | A1* | 9/2010 | Selinger et al. ................. 705/10 |
| 2011/0131084 | A1* | 6/2011 | Shanahan .................... 705/14.4 |
| 2011/0213676 | A1* | 9/2011 | Singh et al. .................. 705/26.7 |
| 2011/0238533 | A1* | 9/2011 | Shadchnev et al. .......... 705/27.1 |
| 2013/0085894 | A1* | 4/2013 | Chan et al. ................. 705/26.64 |

FOREIGN PATENT DOCUMENTS

| WO | WO 2012021780 A2 * | 2/2012 | ............. G06Q 30/00 |
| WO | WO 2012172327 A1 * | 12/2012 | ............. G06Q 30/02 |

* cited by examiner

*Primary Examiner* — Yogesh C Garg
*Assistant Examiner* — Lindsey Smith
(74) *Attorney, Agent, or Firm* — Greenberg Traurig, LLP

(57) ABSTRACT

A system and method for allowing a consumer to quickly access product information and/or commerce functionalities as related to one or more products that are associated with an electronic document, such as a web page, that is currently being viewed by the consumer in an electronic document viewing program, such as an Internet browser.

11 Claims, 3 Drawing Sheets

SYSTEM AND METHOD FOR PROVIDING ACCESS TO PRODUCT INFORMATION AND RELATED FUNCTIONALITIES

RELATED APPLICATION INFORMATION

This application claims the benefit of U.S. Provisional Application No. 61/745,088, filed on Dec. 21, 2012, the disclosure of which is incorporated herein by reference in its entirety.

BACKGROUND

It is common for online consumers to browse the Internet, whether for the purpose of general entertainment or for the specific purpose of looking for product that the online consumer might be interested in purchasing. It is seen, however, that such browsing activities do not result in sales of product to a degree that might otherwise be obtained if such online consumers were able to quickly and seamlessly connect to a vendor of product from a webpage (or other electronic document) that is currently being viewed by such online consumers.

SUMMARY OF THE INVENTION

The following describes a system and method for quickly and seamlessly providing a potential online consumer with product related information and/or commerce related functionalities that are made available to consumers by a vendor of product. By providing the potential consumer with access to such information and functionalities, it is believed that sales of product by the vendor of product can be substantially increased. While not intended to be limiting, the information and commerce related functionalities described hereinafter may be made available to consumers via the use of a program extension, such as a browser plug-in or the like, that is adapted to use information that is associated with an electronic document that is currently being viewed by the consumer, such as a web page, to alter or otherwise supplement the electronic document, for example via use of a pop-up display window, or the like, to thereby provide the consumer with access to product related information and/or with links to one or more commerce related functionalities as provided by the vendor.

The product related information as provided by the vendor can include one or more of an image of a product, pricing information, availability information, product description information, product ratings information, product review information, etc.

The commerce related functionalities as provided by the vendor can include one or more of links for use in placing product into an online shopping cart, causing a display of a Product Details page; causing a display of a catalog page from a catalog, transmitting a message to a recipient containing product related information, adding product to a list, causing a display of a product MSDS sheet, invoking a selection guide, causing a display of product accessories, causing a display of a list of locations at which product is available for purchase, causing a display of product repair information, causing a display of a discount offer associated with product, invoking additional searching or refining tools, or the like as generally disclosed in U.S. Published Application No. 2012/0259730 which is incorporated herein by reference in its entirety.

Preferably, the commerce related functionalities are linked to the product related information, e.g., the product that is the subject of the product related information would be the product that is addable to the shopping cart, the product for which accessories would be shown, the product for which availability would be displayed, etc.

Preferably, the product related information and commerce related functionalities are provided to the consumer in a manner that allows the consumer to continually access the electronic document, e.g., the product related information and/or commerce related functionalities is made available to the consumer in a manner that does not require the consumer to be navigated away from the electronic document that is currently being viewed.

Preferably, the product related information and commerce related functionalities provided to a consumer are relevant to an image, product descriptor(s), or the like that are determined to be of interest to the consumer. In this regard, consumer interest in a product can be directly indicated by the consumer highlighting or otherwise selecting/mousing over an image and/or text within the electronic document being viewed and/or can be inferred by, for example, sensing that the user has positioned or left a cursor over an image or text (or in the area of an image or text) within the electronic document for a predetermined period of time.

While the forgoing provides a general explanation of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which.

DETAILED DESCRIPTION

With reference to the figures, a system and methods are hereinafter described for allowing a consumer to quickly access product information and/or commerce functionalities as related to one or more products that are associated with an electronic document, such as a web page, a PDF document, etc., that is currently being viewed by the consumer in a corresponding electronic document viewing program, such as an Internet browser, PDF viewer, etc. To this end, and without limitation, a vendor may make available to the consumer a program extension, such as a browser plug-in, that will allow the system to utilize cross-referencing information to thereby provide to the consumer product information and/or or commerce functionalities that are relevant to a product that is being shown in or otherwise being described in an electronic document that is currently being viewed by the consumer via use of the program. In this manner, vendor A can, for example, create a program extension that will function to use product information, such as a product image, a product stock keeping unit number or SKU, product description, or the like, that is associated with an electronic document being viewed by a consumer to cause the electronic document that is currently being viewed by the consumer to be directly and/or indirectly supplemented with any product information and/or commerce functionalities of vendor A that is determined to be relevant to product information that is associated with the electronic document that is currently being viewed by the consumer. For this purpose, one or more cross-referencing tables can be utilized that will function to map product information associated with the electronic document, e.g., a product SKU as shown in a vendor B web page or an image of product as shown in a Vendor B web page that is currently being viewed by a consumer, to product information and functionalities of vendor A as generally described in U.S. application Ser. No. 13/693,676, U.S. application Ser. No. 13/295,710, and U.S. application Ser. No. 12/850,149, the disclosures of which are incorporated herein by reference in their entirety. As will become apparent from the description that follows, the cross-referencing tables and functionality utilized to map product information associated with the electronic document to product information and functionalities of the vendor can reside on the consumer's device, e.g., the device executing the browser application, the vendor's server, and/or in the cloud. In still further circumstances, the cross-referencing functionality can utilize information collected from still further web-sites to discern, for example, an SKU of a product of interest to a user—using the functionality described in U.S. Pat. No. 7,546,289 which is incorporated herein by reference in its entirety—whereupon the discerned SKU of the product may be used as the cross-referencing functionality indexing term.

Figure 1:
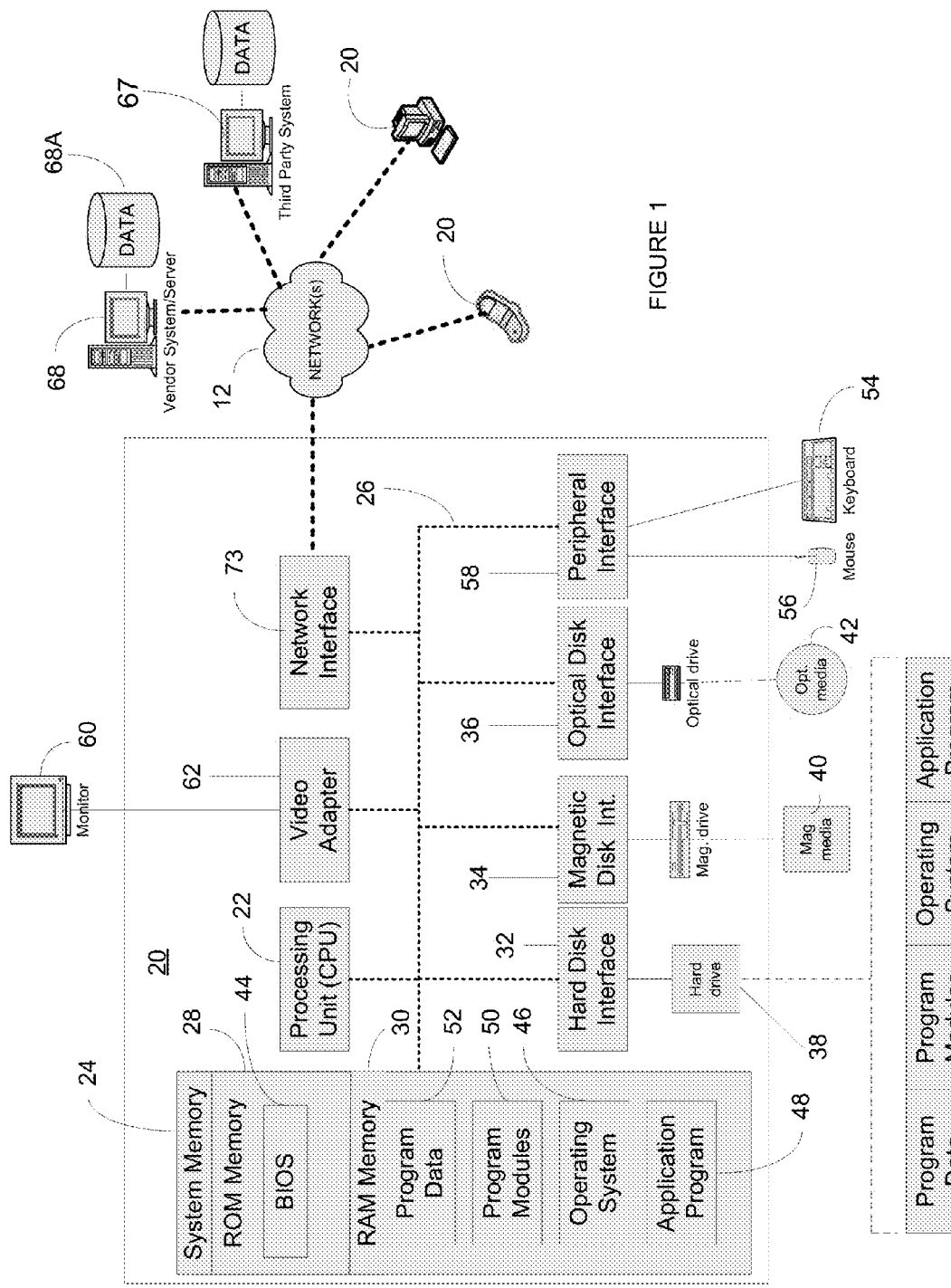
FIG. 1 is a block diagram illustrating components of an exemplary network system in which the methods described hereinafter may be employed.

Turning to FIG. 1, an exemplary computing system comprised of a plurality of processing devices 20/68 linked via a network 12, such as a wide area network or the Internet, is illustrated. Processing devices 20, illustrated in the exemplary form of a device having conventional computer components, are provided with executable instructions to, for example, provide a means for a user to access a remote processing device, e.g., a third party server system 67, via the network 12 to, among other things, view electronic documents made available by such third party, to perform a search for products and/or services (individually and collectively referred to hereinafter as "products"), etc. Generally, the computer executable instructions reside in program modules which may include routines, programs, objects, components, data structures, etc. that perform particular tasks or implement particular abstract data types. Accordingly, those skilled in the art will appreciate that a processing device 20 may be embodied in any device having the ability to execute instructions such as, by way of example, a personal computer, mainframe computer, personal-digital assistant ("PDA"), cellular or smart telephone, tablet computer, or the like. Furthermore, while described and illustrated in the context of discrete processing devices 20, those skilled in the art will also appreciate that the various tasks described hereinafter may be practiced in a distributed or cloud-like environment having multiple processing devices linked via a local or wide-area network whereby the executable instructions, required data, etc. may be associated with and/or executed by one or more of multiple processing devices.

For performing the various tasks in accordance with the executable instructions, a processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional, external memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated non-transient, computer-readable media allow for the nonvolatile storage of computer readable instructions, data structures, program modules and other data for the processing device 20. Those skilled in the art will further appreciate that other types of non-transient, computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser, electronic document viewer/editor, etc.), other program modules 50 (such as program extensions), and/or program data 52. Still further, any such computer-executable instructions may be downloaded to one or more of the computing devices as needed, for example, via a network connection.

A user may interact with the various application programs, etc. of a processing device 20, e.g., to enter commands and information into the processing device 20, through input devices such as a touch screen or keyboard 54 and/or a pointing device 56. While not illustrated, other input devices may include a microphone, a joystick, a game pad, a scanner, a camera, a gesture recognizing device, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

A processing device 20 may also utilize logical connections to one or more remote processing devices, such as vendor server system 68 having one or more associated data repositories 68A in which is stored, for example, product information and customer information. In this regard, while the server system 68 has been illustrated in the exemplary form of a computer, it will be appreciated that the server system 68 may, like processing device 20, be any type of device having processing capabilities. Again, it will be appreciated that the server system 68 need not be implemented as a single device but may be implemented in a manner such that the tasks performed by the server system 68 and/or data needed for performance of such tasks are distributed to a plurality of processing devices linked through a communication network, e.g., implemented in the cloud. Additionally, the server system 68 may have logical connections to other third party server systems via the network 12 as needed and, via such connections, will be associated with data repositories that are associated with such other third party server systems.

For performing tasks, e.g., to support commerce related functionalities, the server system 68 may include many or all of the elements described above relative to the processing device 20. By way of further example, the server system 68 includes executable instructions stored on a non-transient memory device for, among other things, handling search requests, providing search results, accepting user ratings/comments information, for displaying user ratings/comments information, for handling orders for goods, for retrieving and providing inventory information, etc. Communications between the processing device 20 and the server system 68 may be exchanged via a further processing device, such as a network router, that is responsible for network routing. Communications with the network router may be performed via a network interface component 73. Thus, within such a networked environment, e.g., the Internet, World Wide Web, or other like type of wired or wireless network, it will be appreciated that program modules depicted relative to the processing device 20, or portions thereof, may be stored in the memory storage device(s) of the server system 68.

Figure 2:
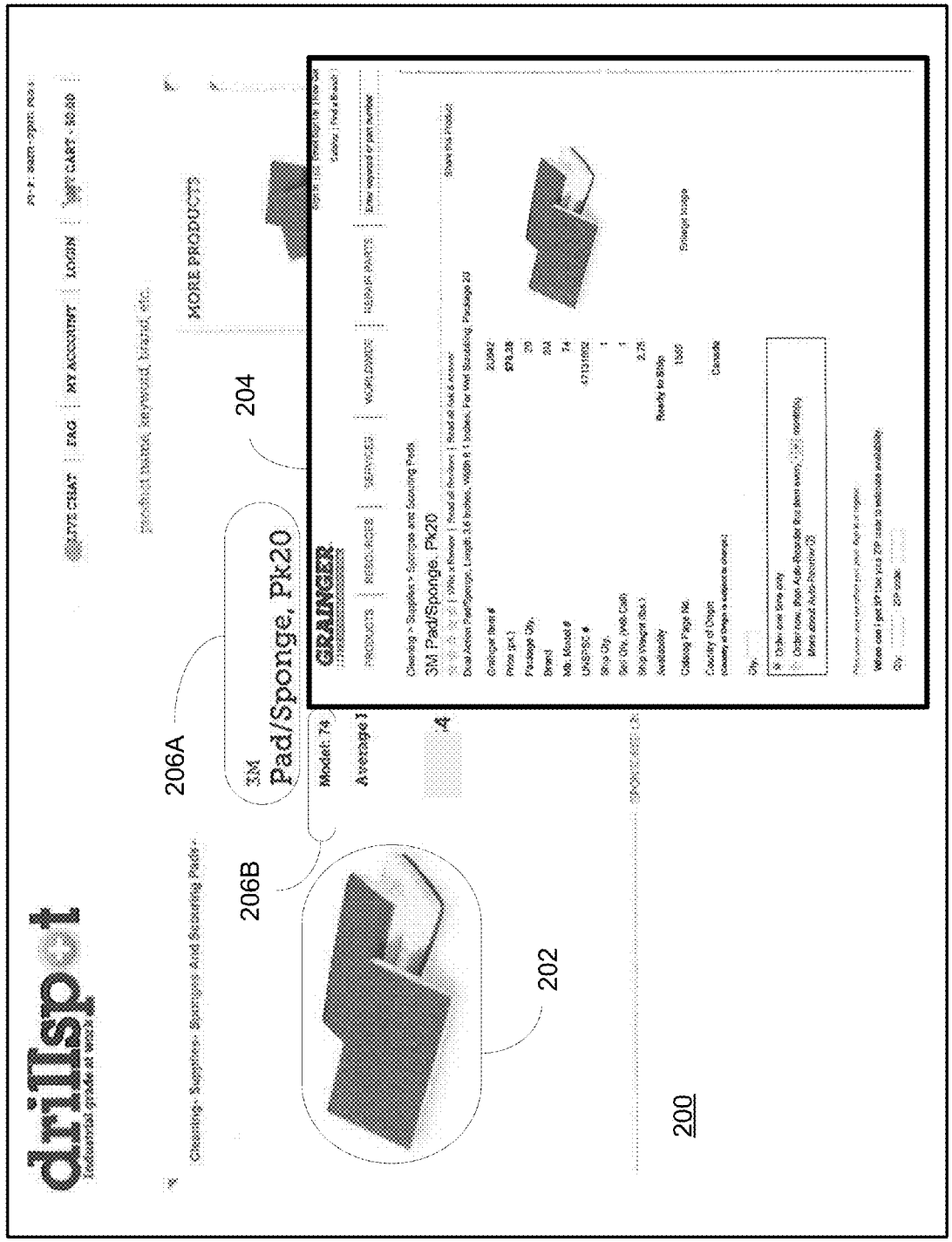
FIGS. 2 and 3 each illustrate an exemplary electronic document being viewed by a consumer with an exemplary vendor supplement being provided thereto.
Figure 3:
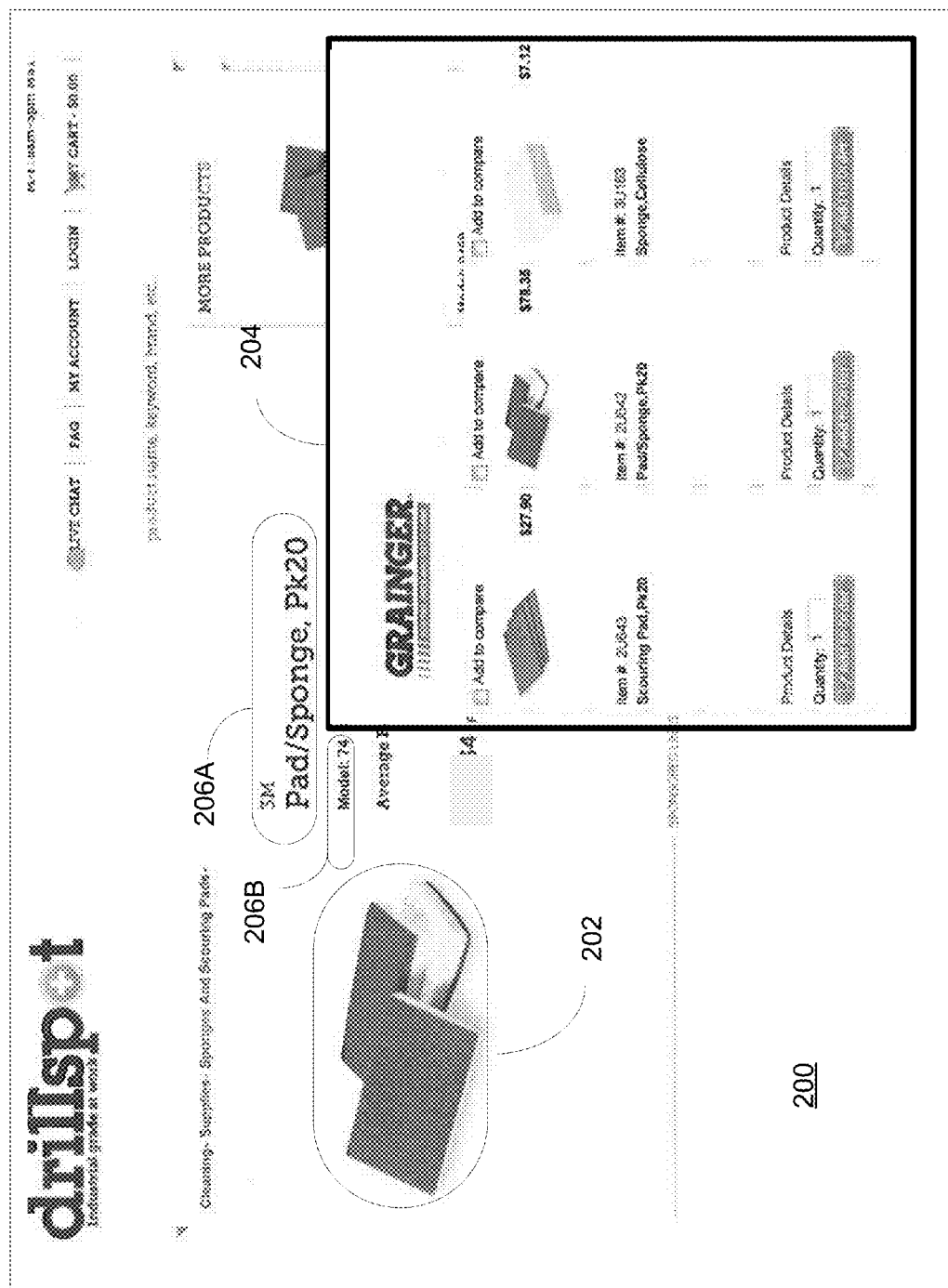

As noted above, the subject system and method functions to provide a user with access to product related information and/or commerce functionalities of a vendor that is related to a product that is determined to be of interest to a consumer. By way of example, as shown in FIGS. 2 and 3, when a consumer accesses an electronic document, such as a web page 200 of vendor B, and indicates (whether directly or inferentially) an interest in a product that is shown or otherwise referenced in the electronic document, e.g., the "3M Pad/Sponge," the program extension will function to cause a display of product information and/or commerce functionalities as retrieved from the vendor server system 68 that is related to the product that was indicated to be of interest to the consumer. While the product information and/or commerce functionality is illustrated as being displayed in a pop-up window 204, it will be appreciated that other manners of displaying the product information and/or commerce functionalities, such as by modifying the electronic document itself (e.g., by overwriting the SKUs of vendor B with the SKUs of vendor A or the like), can be utilized to ensure that the desired product information and/or commerce functionalities are presented to the consumer without requiring the consumer to be navigated away from the electronic document that is being viewed. More particularly, in response to the consumer highlighting (e.g., drawing a box around or the like), mousing over, hovering the cursor over, or otherwise selecting product information within the electronic document, e.g., the product image 202, product describing text 206A and/or 206B, etc., the product information (whether captured from the screen display, retrieved from computer cache memory, or the like) can be uploaded to the vendor system server 68 where it can be analyzed to determine if the uploaded product information corresponds to, i.e., is cross-referenced or indexed to, any product that is within the database of the vendor. In the event that the indicated product information does correspond to a product that is within the database of the vendor, the system server 68, in cooperation with the program extension, will then be used to cause product information and/or commerce functionalities related to the cross-referenced vendor product to be presented to the consumer in pop-up 204. As illustrated in FIG. 2, the product information and/or commerce functionalities presented to the consumer in pop-up 204 can be limited to only the product information and/or commerce functionalities that pertain to a single product that is determined to correspond to the product information that was indicated as being of interest to the consumer. Alternatively, as illustrated in FIG. 3, the product information and/or commerce functionalities presented to the consumer in pop-up 204 can relate to a single product that most closely or actually corresponds to the product information indicated as being of interest to the consumer as well as like products that are determined to be alternatives to or similar to a product represented by the product information that was indicated as being of interest to the consumer. In the example illustrated in FIG. 3 the commerce functionalities provided to the consumer in the pop-up can include functionality for allowing the consumer to compare selected ones of the multiple products that have been determined to be relevant to the product information that was indicated as being of interest to the consumer. It is also contemplated that the product information and/or commerce functionalities like that illustrated in illustrated in FIG. 3 can be made available to the consumer in circumstances where product information for multiple products are indicated to be of interest to a consumer. In this regard, various techniques can be utilized for allowing a consumer to indicate that plural images and/or text for multiple products associated with the displayed electronic document are of interest to the user, such as by allowing the consumer to drag and drop images and/or text corresponding to multiple different products of interest into a designated area of the presented document or otherwise made available by the document viewing program, by allowing for the highlighting or selection of multiple images and/or text, etc.

In some circumstances, pricing information for a product, to the extent available, can also be captured from the electronic document being viewed by the consumer and, if such pricing is determined to be acceptable to the vendor, such captured pricing information can be used in the product related information presented to the user in lieu of pricing information that would otherwise be obtained from the vendor system database 68A. To this end, the vendor system 68 may specify a predetermined dollar amount or percentage from which the pricing for the vendor product can be reduced when considering pricing information captured from the electronic document for the purpose of provide competitive pricing. In the event such competitive pricing is to be offered, the competitive pricing will be tracked by the vendor system server 68 throughout the ordering and purchasing process. For logged in consumers (e.g., a vendor cookie is detected), consumer specific pricing can be used as applicable. For such recognized consumers, the product information and/or services returned could also include consumer specific information and/or services such as links to personal lists, links to prior order history information, etc.

It will also be appreciated that the electronic document can be scanned/parsed upon being loaded into the electronic document displaying program to thereby attempt to cross-reference any product related information contained therein to product information and/or commerce functionality offered by the vendor prior to the user indicating that any particular product information contained within the electronic document is of interest to the consumer. In this manner, the potentially relevant product information and/or commerce functionalities can be pre-loaded to the consumer's computing device at a point in time prior to the need to display the same to the consumer.

It will also be appreciated that the product images with the electronic documents that are used to locate product information and/or commerce functionalities for display to a consumer need not be limited to photographs or images of actual product but can instead by hand drawn images or wire images such as found in a parts diagram or a user's manual.

It will be further appreciated that the commerce functionalities presented to the consumer can include mechanisms for allowing the consumer to refine search results when multiple different vendor products are capable of matching the product information that has been determined to be of interest to a consumer. For example, if an image of a motor or a description of a motor is determined to be of interest to the consumer and multiple different motor products of the vendor might correspond to the product information, the commerce functionalities that are caused to be displayed to the consumer can include a motor match selection guide which can be used by the consumer to locate a specific motor that might be of interest to the consumer. As further described in U.S. application Ser. No. 13/568,927 which is incorporated herein by reference in its entirety, when certain parametric values for the product can be discerned from the image and/or text indicated as being of interest to the consumer, such parametric values can be used to pre-populate the selection guide when presented to the consumer.

While described in the context of a selection guide being presented to the consumer, it will be appreciated that other well-known functionalities for performing search refinement, such a drill down menuing, can be provided for this same purpose. For example, refinement can be provided by causing the system to present to the consumer a listing of products that the system has discerned as being possible relevant matches for the product that has been indicated to be of interest to the consumer. In this manner, the consumer may then select from the listing one or more of the presented vendor products whereupon the system will respond by providing to the consumer the relevant product information for the one or more selected products in the manner described above. In the event that multiple possible matches are provided to the consumer for selection by the system, the multiple possible matches could be ranked by the system within the listing provided considering, for example, product parametric values extracted the Web page being viewed, prior purchasing history of the consumer, etc.

Yet further, it will be appreciated that the functionalities made available to the consumer can provide a means for a consumer to further refine the product that is caused to be presented to the consumer. For example, the functionalities may allow the consumer to change the sizing of, color of, ornamentation of, text of, or the like of the product information that is first caused to be presented to the consumer. In this manner, any changes made to the product information can be ported to the vendor and used when, for example, the consumer indicates a desire to purchase the product as modified by the consumer.

In certain circumstances the system may additionally provide for the automatic presentation of (or provide access to) a comparison table which can include comparison data for the $1^{st}$ vendor product and one or more of the $2^{nd}$ vendor product that is cross-referenced to the $1^{st}$ vendor product. Thus, it will be appreciated that the product related information retrieved for the second vendor of product can include such tables, text, images, links, HTML, and/or the like without limitation.

It will be still further appreciated that the commerce functionalities presented to the consumer can include mechanisms for allowing a consumer to obtain parts information for a product indicated as being of interest in an electronic document being viewed, e.g., a motor. The functionalities described herein can then be likewise employed with the displayed parts information, e.g., an exploded view of the product and/or a parts listing, to thereby allow the consumer to indicate that one or more part images and/or part text entries within the displayed parts information, e.g., a supplemental electronic document that was caused to be displayed, are of interest to the consumer whereupon information and/or functionalities relevant to such parts can be presented to the user in the manner above described whether in a further pop-up or in the same pop-up window.

In an embodiment wherein the electronic document is itself altered as it is being displayed to the consumer, it is contemplated that the determined relevant product information from the vendor, e.g., a product SKU of the vendor, links, images, etc., can be merely substituted for the like product information shown in the electronic document. Furthermore, it is contemplated that this substituted product information can be make interactive, i.e., can act as a link, whereupon interaction with the substituted product information can be used by the system to cause the display of further product information and/or related commerce functionalities in a pop-up of the like as disclosed above. The attention of the consumer can be further drawn to any substituted product information by having the substituted product information highlighted, underlined, bolded, changed in font size, changed in color, or the like within the electronic document.

It is also contemplated that the system can be interactive. For example, the plug-in can provide a drop-box or the like into which a user can drag information from the displayed Web page, e.g., images and/or words, whereupon the information captured from the Web page in this manner can be utilized by the system to discern relevant product information from the vendor as describe above.

It is additionally contemplated that the plug-in could be intelligent such that web pages of different vendors are parsed considering conventions that are used by the different vendors when presenting product information. For example, if vendor A always places a product image below related product text while vendor B always places a product image above related product text, the intelligent plug-in would function to parse the web page of vendor A and vendor B differently to maintain related information together while considering the web page creation conventions of the different vendors.

While various concepts have been described in detail, it will be appreciated by those skilled in the art that various modifications and alternatives to those concepts could be developed in light of the overall teachings of the disclosure. For example, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transient computer-readable media having computer executable instructions stored thereon which, when executed by a processing device, provides to an electronic document viewing program a user input feature for allowing a consumer to use product information contained within an electronic document obtained from a first vendor that is being rendered by the electronic document viewing program to obtain product information from a second vendor via a web site that is associated with the second vendor when the web site associated with the second vendor is otherwise unlinked to by the electronic document itself, the instructions performing steps comprising:

in response to the consumer using the user input feature to interact with the electronic document to identify at least a part of the electronic document that is being rendered by the electronic document viewing program as being of interest to the consumer, parsing the identified at least a part of the electronic document to extract from the identified at least a part of the electronic document information related to a first product being offered for sale by the first vendor;

providing the information related to the first product being offered for sale by the first vendor as extracted from the identified at least a part of the electronic document to the web site associated with the second vendor and, in response, receiving from the web site associated with the second vendor information related to a second product being offered for sale by the second vendor that has been cross-referenced to the provided information related to the first product being offered for sale by the first vendor;

causing the electronic document viewing program to automatically alter the electronic document as the electronic document is being rendered by the electronic document viewing program whereby the information related to the second product being offered for sale by the second vendor retrieved from the web site associated with the second vendor and at least one user interface element having an associated commerce related functionality that is executable by the web site associated with the second vendor are inserted into the electronic document in substitution for the information related to a first product being offered for sale by the first vendor within the identified at least a part of the electronic document; and in response to the consumer activating the at least one user interface element, causing a communication to be transmitted to the web site associated with the second vendor, the communication including a command to have the web site associated with the second vendor execute the commerce related functionality that is associated with the activated at least one user interface element with use of at least a portion of the information related to the second product being offered for sale by the second vendor retrieved from the web site associated with the second vendor.

2. The non-transient computer-readable media as recited in claim 1, wherein the command comprises data for instructing operation of a commerce related functionality that causes the web site associated with the second vendor to add the second product to a shopping cart maintained by the web site associated with the second vendor.

3. The non-transient computer-readable media as recited in claim 1, wherein the command comprises data for instructing operation of a commerce related functionality that causes the web site associated with the second vendor to initiate a purchase of the second product from the second vendor.

4. The non-transient computer-readable media as recited in claim 1, wherein the command comprises data for instructing operation of a commerce related functionality that causes the web site associated with the second vendor to add the second product to a list maintained by the web site associated with the second vendor.

5. The non-transient computer-readable media as recited in claim 1, wherein the step of parsing the identified at least a part of the electronic document comprises extracting from the identified at least a part of the electronic document at least an image of the first product.

6. The non-transient computer-readable media as recited in claim 5, wherein the instructions upload data representative of the extracted image to the web site associated with the second vendor for use in receiving from the web site associated with the second vendor the information related to the product being offered for sale by the second vendor.

7. The non-transient computer-readable media as recited in claim 5, wherein the user input feature allows the consumer to identify at least a part of the electronic document that is being rendered by the electronic document viewing program as being of interest to the user via use of a mousing over interaction with the electronic document.

8. The non-transient computer-readable media as recited in claim 1, wherein the user input feature allows the consumer to identify at least a part of the electronic document that is being rendered by the electronic document viewing program as being of interest to the user via use of a highlighting interaction with the electronic document.

9. The non-transient computer readable media as recited in claim 1, wherein the user input feature allows the consumer to identify at least a part of the electronic document that is being rendered by the electronic document viewing program as being of interest to the user via use of a drag and drop interaction with the electronic document.

10. The non-transient computer-readable media as recited in claim 1, wherein the instructions determine if the consumer is a recognized consumer and, when the consumer is a recognized consumer, the instructions cause a retrieval of consumer specific information from the web site associated with the second vendor and wherein the modified electronic document has added thereto the consumer specific information retrieved from the web site associated with the second vendor.

11. The non-transient computer-readable media as recited in claim 10, wherein the consumer specific information comprises consumer specific pricing information for the second product.

* * * * *